UNITED STATES PATENT OFFICE.

WILLIAM LENDEROTH, OF DESERONTO, ONTARIO, CANADA.

PROCESS OF MANUFACTURING POROUS EARTHENWARE.

SPECIFICATION forming part of Letters Patent No. 426,643, dated April 29, 1890.

Application filed September 11, 1888. Serial No. 285,152. (No model.)

*To all whom it may concern:*

Be it known that I, WILLIAM LENDEROTH, of Deseronto, county of Hastings, Province of Ontario, Canada, have invented an Improved Process for Manufacturing Porous Earthenware Building Material, of which the following is a specification.

The object of my invention is to provide an improved process for manufacturing porous earthenware building material, which material shall be able to withstand the action of high temperatures and have strength to resist without cracking or crushing the pressure of high walls, arches, &c.

In carrying out my invention I make a mixture of dampened clay of any of the varieties and sand or sandy fire-clay in such proportions that the mixture will not vitrify when exposed to a temperature hot enough to reduce to ashes sawdust or the like. For instance, I take eighty-five parts of pure clay and fifteen parts of sand for the mixture. I then take sawdust, coal-dust, chopped straw, or other similar combustible material, and add to it lime, cryolite, baryta, or other similar material. The sawdust or its equivalents should be thoroughly saturated with water, so that each grain or particle will absorb all the water it can, and thus expand to its largest dimensions. I then add this mixture of combustible material, lime or its equivalents, and water to the clay-and-sand mixture before mentioned and thoroughly intermix them in any suitable manner.

The proportions of clay mixture, sawdust or its equivalents, and lime or its equivalents may vary and are dependent upon the amount of porosity required in the product and the strength or hardness desired. In practice I find that three parts of the clay mixture and from two to six parts of saturated sawdust and from two to fifteen per cent. of lime or its equivalents produce good results.

The object of having the sawdust or its equivalents saturated with water is to prevent the particles absorbing water from the clay and from expanding after being mixed with the clay, and thereby producing strains or cracks.

After thoroughly mixing the above ingredients I preferably pass the mixture through a machine having rollers revolving toward each other, the one of which has a higher surface velocity than the other. By the action of these rollers a more thorough and perfect mixture of the clay and other ingredients is obtained. Sufficient water is used to make the mass plastic, and it is put into a "pug-mill." I prefer an auger or screw press; but any of the presses commonly used for this class of work will answer. The plastic mixture is by this machine expressed through suitable dies in the form of a column of whatever section it is desired the dies should produce. It is then cut into such lengths as may be desired, and the blocks thus formed are removed to a drying room or shed. In this shed the mixture is partially dried by exposure to warm air. I then remove the blocks to a kiln or other suitable receptacle and subject them to a heat of about 1,800° Fahrenheit, which reduces the sawdust or the like in the mixture to ashes, thereby leaving cells in the mixture. The heat at this time is not permitted to become greater than is necessary to reduce to ashes the sawdust or other combustible ingredient. The ashes thus produced, together with the lime or its equivalents previously added to the mixture, form a flux in the mixture. By keeping the heat low enough—namely, at about 1,800° Fahrenheit—to merely reduce the sawdust, &c., to ashes and form a flux, I prevent the clay and sand from vitrifying. After the flux is created the temperature upon the mixture is increased till it is sufficiently high to cause the said flux to produce vitrifaction or partial vitrifaction around the cells within the blocks, thereby producing a mass of glazed or incrusted cells, which, when the blocks are cold, is harder and stronger than the other parts of the material, but which leaves the block porous between the incrusted cells. These blocks, when removed from the kiln and ready for use, are free from cracks, and when struck a sharp blow ring like a piece of sound crockery.

By adding sand to the clay, or by mixing various kinds of clay having different compositions, mixtures may be produced which will vitrify on the cells at higher or lower temperatures, some being subject to vitrifaction at comparatively low temperatures, while others will remain unchanged at a temperature that would melt cast-iron.

As compared with the porous blocks hitherto made, those produced by my process are stronger and will safely resist a greater pressure. They are not so easily injured by fire or by efforts to extinguish a fire. They also resist the action of acids more successfully and hold nails more firmly than any other porous material known to me.

I am aware that clay and sawdust and clay and coal-dust have long been used to produce porous terra-cotta, porous bricks, porous hollow ware, and such like material, and I am acquainted with the various processes of their manufacture.

I am acquainted with a process of mixing sawdust, clay free from grit, and straw or vegetable fiber which produces a building material to be worked with edge-tools.

I am also acquainted with a process of making porous earthenware by mixing clay and sawdust and straw cut in short pieces; but my process and the material produced by it differ from any of these principally in the following points: first, in making and using a clay mixture that will not vitrify at a temperature sufficient to consume the sawdust or other material used instead of sawdust; second, in adding lime or its equivalents to the sawdust to form a flux only with the ashes of the sawdust or other material; third, in keeping the temperature of the kiln comparatively low until the combustible portion of the mixture is reduced to ashes, and then raising the temperature sufficiently high to cause the flux to act, and so produce the incrustations around the cells; fourth, the resulting product differs from all other porous building material known to me in being stronger and in having the glazing or incrusting surfaces around the cells, as described.

Having now described my invention, what I claim is—

The process herein described of forming porous earthenware, which consists in subjecting a mixture of clay, sand, sawdust, and lime first to such a degree of heat, as described, as will reduce the sawdust to ashes and will combine said ashes with the heated lime into a flux, and in afterward increasing the temperature to cause said flux of lime and ashes to incrust and vitrify around the cells without at the same time vitrifying the mixture of clay and sand, substantially as specified.

WILLIAM LENDEROTH.

Witnesses:
  T. F. BOURNE,
  HARRY M. TURK.